Jan. 2, 1923.

M. E. LEVY.
Variable Speed Pulley.
Filed Apr. 16, 1921.

1,441,006

Witness
J. L. Brown.

Inventor
Maurice E. Levy
By Sprinkle, Hopkins M<sup>c</sup>Nair
Attys.

Patented Jan. 2, 1923.

1,441,006

UNITED STATES PATENT OFFICE.

MAURICE E. LEVY, OF CHICAGO, ILLINOIS.

VARIABLE-SPEED PULLEY.

Application filed April 16, 1921. Serial No. 461,843.

*To all whom it may concern:*

Be it known that I, MAURICE E. LEVY, a citizen of the United States, residing at Chicago, county of Cook, and State of Illinois, have invented certain new and useful Improvements in Variable-Speed Pulleys, of which the following is a specification.

My invention relates to variable speed pulleys, and has particular reference to pulleys the diameter of which may be varied for the purpose of effecting different speeds between two shafts.

Generally speaking, in carrying out the preferred embodiment of my invention, I employ a variable speed pulley, which is substantially cage-like in appearance and which comprises a plurality of arms hinged at one end to a spider keyed to a shaft, the other ends of which arms are connected, by links, to a sliding collar, forming a series of toggles, so that, as the collar is slid in either direction along the shaft, the diameter of the cage, defined by the arms and links, may be varied.

An object of my invention is to provide a variable speed pulley arrangement wherein speed variations may be effected without stopping the machinery.

Another object of my invention is to provide a variable speed changing device in which there are employed two shafts, preferably in parallel relation, each of which is provided with a pulley, the pulleys being connected so that the diameters may be varied simultaneously.

A further object of the invention is to provide a variable speed pulley arranged for generally successful commercial use.

The various novel features of my invention will be apparent from the following specification and drawings, and will be particularly pointed out in the appended claims.

I have shown the preferred embodiment of my invention on the attached sheet of the drawing, of which—

Figure 1:
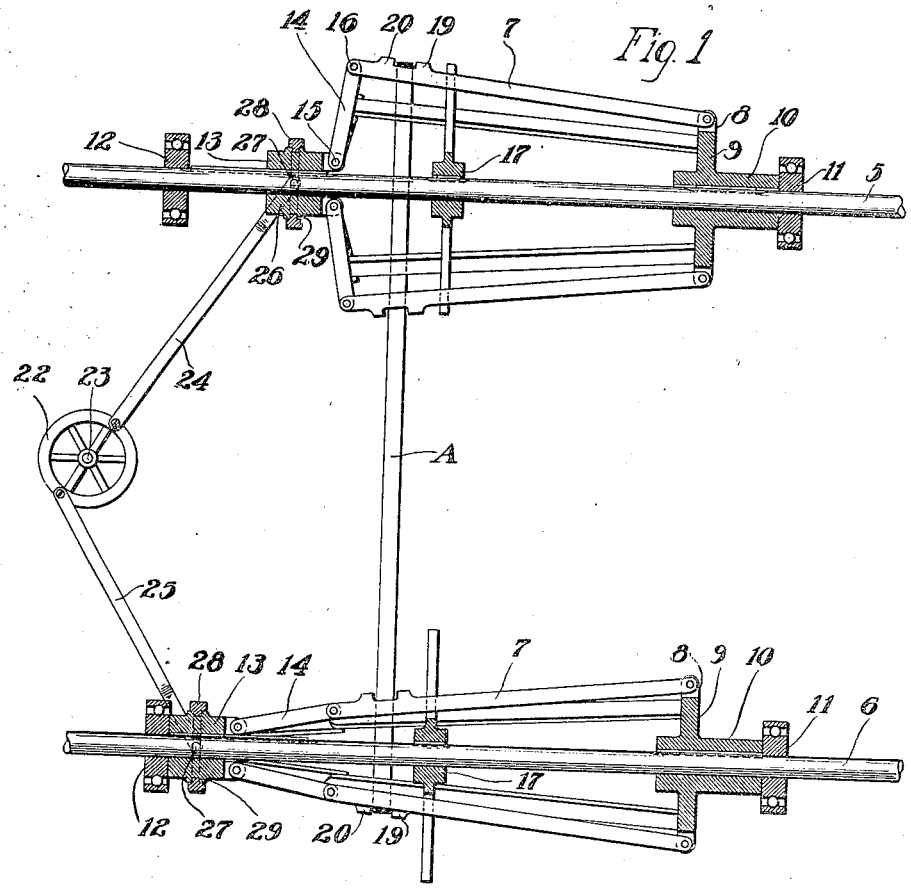
Fig. 1 is a plan view of the pulleys arranged on parallel shafts, one pulley being shown at its maximum diameter and the other at its minimum.
Figure 2:
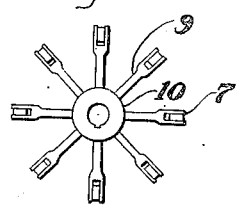
Fig. 2 is an elevation of one of the spiders employed in the arrangement of Fig. 1.
Figure 3:
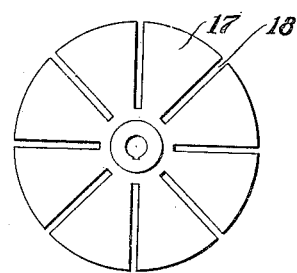
Fig. 3 is an elevation of a guide member carried on the shafts for keeping the arms in proper position for carrying out the purposes of the invention.

I have shown, in Fig. 1, pulleys mounted on adjacent shafts 5 and 6, the usual arrangement being to mount these in a casing or similar enclosure for purposes well understood. However, for the sake of clearness, I have omitted the enclosing structure.

5 may be termed the drive shaft and shaft 6 the driven shaft, rotation being imparted to shaft 5 in any desirable manner. The driven shaft 6 may be connected to any load element.

The variable speed pulley, as shown in these drawings, includes a plurality of arms 7 which are connected at one end to the bifurcated ends 8 of the spokes 9 of a spider 10, which spider is keyed to the shaft 5. As shown in the drawings, the spider has a hub portion, which rests against a bearing member 11, which supports the shaft 5 in the housing or casing (not shown). Near a similar bearing 12, and which would be placed at the opposite side of the enclosure, a collar 13 is splined to the shaft. Links 14 are pivoted at 15 to the collar, while the other ends of the links are pivoted at 16 to what may be termed the free ends of the arms 7. It will, therefore, be noted that the arms 7 and the links 14 form what I term a cage, the diameter of which may be varied by sliding the collar 13 along the shaft 5. As a means for maintaining the several arms 7 in proper position, I may provide a guide member 17, which has a plurality of slots 18 therein, and is keyed to the shaft 5. The slots are made deep enough so as to permit the arms 7 to occupy the position shown in the lower part of Fig. 1, which is the position occupied when the diameter of the variable pulley is at its minimum. The outer edges of the arm 7 are provided with shoulders 19 and 20 extending radially, which shoulders serve as guide members or as flanges between which a belt "A" is received, the purpose of the flanges 19 and 20 being to prevent displacement of the belt "A," as the diameters of the pulleys are changed. For effective variation in the diameters of the cage pulleys, it is essential that the increase and decrease be simultaneous, so that the transmission power may be even, also that the belt "A" may be kept taut. One of the means which I have shown for accomplishing simultaneous variation in the diameters is depicted in Fig. 1, and consists of a hand wheel 22 mounted on a spindle 23 suitably supported. Extending from diametrically opposite points on the hand wheel 22 are two arms 24 and 25. These arms have preferably bifurcated end portions 26, adapted to straddle the collars 13, and have engagement by means of pins 27 with rings 28, co-operating with suitably disposed grooves 29 in the collars 13. The variation of the diameters of the pulleys is then accomplished by turning the hand wheel 22 in either direction, depending on the variation sought. It is understood that other means may be employed for simultaneously moving the collars 13 to vary the diameters of the pulleys.

As the arms 7 are shown in the drawings, these extend in the direction of the length of the shafts 5 and 6, and, being substantially rectangular in cross section, may be said to lie in planes including the axes of shafts 5 and 6, as the case may be.

While I have described more or less precisely the details of construction of my invention, I do not wish to be understood as limiting myself thereto, as I contemplate changes in form and the proportion of parts and the substitution of equivalents, as circumstances may suggest or render expedient, without departing from the spirit of my invention.

I claim:

1. A variable speed pulley which is substantially cage-like in outline, comprising, in combination, a shaft, a spider keyed thereto, a collar spaced from said spider and splined on the shaft, a plurality of arms pivoted at one end to the spider, a plurality of links pivoted to the collar with the free ends of the links joined to the free ends of the arms, said arms being provided with means for receiving a belt, said belt receiving means being wholly on said arms and spaced from the pivotal connection of the arms and the links, and means for sliding said collar along the shaft for spreading or retracting said arms to vary the diameter of the belt receiving portion.

2. A variable speed pulley construction, comprising, in combination, two spaced shafts, each shaft provided with a spider keyed thereto, each shaft having a collar splined thereto for movement thereon, a plurality of arms joined at one end to the spider, a plurality of links shorter than said arms joined at one end to the collar, the other ends of the links and arms being pivotally connected, said arms being provided with means for receiving and retaining a belt, and means connecting said collars for sliding the same along their shafts for simultaneously changing the diameters of the belt receiving portions of the arms.

3. A variable speed changing device, in combination, a pair of parallel shafts, each shaft having a pulley thereon which is substantially cagelike in form, each pulley comprising a spider keyed to its shaft and a collar splined to its shaft, a plurality of arms pivoted to the spider and extending in the direction of the length of the shaft, links shorter than said arms pivoted to the collars at one end and pivoted to the arms at the other end, means for simultaneously moving said collars along their shafts, a belt receiving portion on said arms spaced from the pivotal connection of the same with said links, and a belt passing over the arms of each pulley.

4. A pair of expansible pulleys each having a spider adapted to be non-slidably keyed to its shaft, each having a collar splined on its shaft for sliding movement there along, arms connected at one end to said spider, links shorter than said arms and connected to said collar, said arms and links being pivotally connected at the adjacent ends thereof, said arms being provided with flange-like members for receiving a belt, said belt members being distant from the pivotal connection of said arms and links, slotted guides keyed to each shaft arranged in such manner that an arm passes through a slot whereby relative lateral position of said arms may be maintained and driving force imparted to said arms by said guide members other than that of the spider and link connection therewith.

Signed at Chicago, Illinois, this 13th day of April, A. D. 1921.

MAURICE E. LEVY.